United States Patent
Kikuchi et al.

(10) Patent No.: US 8,592,510 B2
(45) Date of Patent: Nov. 26, 2013

(54) RUBBER COMPOSITION FOR STUDLESS TIRE AND STUDLESS TIRE USING THEREOF

(75) Inventors: Naohiko Kikuchi, Kobe (JP); Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 362 days.

(21) Appl. No.: 12/668,776

(22) PCT Filed: May 30, 2008

(86) PCT No.: PCT/JP2008/060034
§ 371 (c)(1),
(2), (4) Date: Jan. 12, 2010

(87) PCT Pub. No.: WO2009/031347
PCT Pub. Date: Mar. 12, 2009

(65) Prior Publication Data
US 2010/0190906 A1 Jul. 29, 2010

(30) Foreign Application Priority Data
Sep. 5, 2007 (JP) .................. 2007-230438

(51) Int. Cl.
*C08K 3/30* (2006.01)
(52) U.S. Cl.
USPC .......................................... 524/418; 524/420
(58) Field of Classification Search
USPC ........................................................ 524/418
See application file for complete search history.

(56) References Cited

U.S. PATENT DOCUMENTS

| 2002/0107338 | A1 | 8/2002 | Wonmun et al. | |
|---|---|---|---|---|
| 2003/0195302 | A1 | 10/2003 | Yatsuyanagi et al. | |
| 2006/0052507 | A1 | 3/2006 | Minakoshi | |
| 2006/0094831 | A1 * | 5/2006 | Choi et al. | 525/331.9 |
| 2006/0173118 | A1 * | 8/2006 | Hochi et al. | 524/492 |
| 2006/0189746 | A1 | 8/2006 | Kunisawa et al. | |

FOREIGN PATENT DOCUMENTS

| CN | 1761709 | A |   | 4/2006 |
|---|---|---|---|---|
| CN | 1821293 | A |   | 8/2006 |
| EP | 1 690 895 | A1 |   | 8/2006 |
| EP | 1 695 998 | A1 |   | 8/2006 |
| EP | 1 792 937 | A1 |   | 6/2007 |
| JP | 57-170939 | A |   | 10/1982 |
| JP | 58-167634 | A |   | 10/1983 |
| JP | 59-213745 | A |   | 12/1984 |
| JP | 6-240052 | A |   | 8/1994 |
| JP | 8-104777 | A |   | 4/1996 |
| JP | 10-251514 | A |   | 9/1998 |
| JP | 2000-17116 | A |   | 1/2000 |
| JP | 2001-31797 | A |   | 2/2001 |
| JP | 2001-139795 | A |   | 5/2001 |
| JP | 2001-279025 | A |   | 10/2001 |
| JP | 2002-293783 | A |   | 10/2002 |
| JP | 2005-48083 | A |   | 2/2005 |
| JP | 2005048083 | A | * | 2/2005 |
| JP | 2005-67358 | A |   | 3/2005 |
| JP | 2006-77050 | A |   | 3/2006 |
| JP | 2006-199785 | A |   | 8/2006 |
| JP | 2006-232922 | A |   | 9/2006 |
| JP | 2006-233177 | A |   | 9/2006 |
| JP | 2006-249403 | A |   | 9/2006 |
| JP | 2007-92085 | A |   | 4/2007 |
| JP | 2007-92086 | A |   | 4/2007 |
| JP | 2007-107015 | A |   | 4/2007 |
| JP | 2007-146168 | A |   | 6/2007 |

OTHER PUBLICATIONS

Translation of JP 2005048083, Feb. 2005.*
Chinese Office Action for 200880106021.4 dated Oct. 26, 2011.
Office Action dated Aug. 30, 2011 for corresponding Japanese Application No. 2008-142730.
Extended European Search Report dated Mar. 28, 2012 for Application No. 08777045.9.
Russian Office Action and English translation dated Apr. 25, 2011 for Application No. 2010109346/05(013109).
Fedyoukin et al., "Technicheskie i technologicheskie svoistva resin", pp. 7-9, 1985 with an English abstract.

* cited by examiner

*Primary Examiner* — Hui Chin
(74) *Attorney, Agent, or Firm* — Birch, Stewart, Kolasch & Birch, LLP

(57) ABSTRACT

A rubber composition controlling the increase of aging hardness of a studless tire and keeping good performance on snow and ice for long period is provided. A rubber composition for a studless tire including at most 0.5 part by weight of sulfur and 1 to 30 parts by weight of an organic vulcanizing agent satisfying the general formula (1):

$$-(R-S_x)_n- \tag{1}$$

(wherein R is $(CH_2-CH_2-O)_m-CH_2-CH_2$, x is an integer of 3 to 6, n is an integer of 10 to 400 and m represents an integer of 2 to 5) based on 100 parts by weight of a rubber component, wherein the content of a natural rubber and/or a polybutadiene rubber is at least 80% by weight in the rubber component, and tan δ peak temperature Tg is at most −50° C. and rubber hardness at 0° C. is at most 64.

4 Claims, No Drawings

RUBBER COMPOSITION FOR STUDLESS TIRE AND STUDLESS TIRE USING THEREOF

TECHNICAL FIELD

The present invention relates to a rubber composition for a studless tire and a studless tire using the rubber composition.

BACKGROUND ART

Although the use of a spiked tire and the installation of a chain on a tire have been carried out as running on snow and ice road surface, a studless tire is developed as a tire for running on snow and ice road surface in place of this because environmental problem such as dust problem is generated. Since friction coefficient is remarkably lowered on snow and ice road and tires slide easily in comparison with a general road surface, devices on materials and design have been carried out for a studless tire and a studless tire excellent in braking performance on ice has been developed.

In Japanese Unexamined Patent Publication No. 08-104777, there is disclosed a rubber composition for a tire using rubber vulcanization system comprising sulfur as a vulcanizing agent and a vulcanization accelerator in combination with an organic peroxide, in order to improve steering stability, fuel consumption saving and abrasion resistance. However, since the adjustment of vulcanization speed is difficult, there remains problem that it is not generally used yet.

In Japanese Unexamined Patent Publication No. 2001-279025, there are disclosed the production process of a rubber product, wherein vulcanization reaction is accelerated by (1) coating core materials comprising vulcanization components with a resin composition containing magnetic metal powder to obtain granules, (2) mixing the granules with rubber components to obtain a rubber composition, (3) heating the rubber composition with electromagnetic induction and (4) dissolving the resin composition to disperse vulcanization components in the rubber components of the rubber composition, and the rubber product obtained by the production process. However, there remains problem that productivity is inferior because steps increase.

DISCLOSURE OF INVENTION

It is the purpose of the present invention to provide a rubber composition controlling the increase of aging hardness of a studless tire and keeping good performance on snow and ice for long period.

The present invention relates to a rubber composition for a studless tire including at most 0.5 part by weight of sulfur and 1 to 30 parts by weight of an organic vulcanizing agent satisfying the general formula (1):

$$-(R-S_x)_n- \quad (1)$$

(wherein R is $(CH_2-CH_2-O)_m-CH_2-CH_2$, x is an integer of 3 to 6, n is an integer of 10 to 400 and m represents an integer of 2 to 5) based on 100 parts by weight of a rubber component, wherein the content of a natural rubber and/or a polybutadiene rubber is at least 80% by weight in the rubber component, wherein tan δ peak temperature Tg is at most −50° C. and rubber hardness at 0° C. is at most 64.

The rubber component is preferably a rubber component comprising 20 to 80% by weight of a natural rubber and 80 to 20% by weight of a polybutadiene rubber.

Further, the present invention relates to a studless tire using the rubber composition for a studless tire.

BEST MODE FOR CARRYING OUT THE INVENTION

The rubber composition for a studless tire of the present invention includes a rubber component and an organic vulcanizing agent and reduces the compounding amount of sulfur, tan δ peak temperature Tg is at most −50° C. and rubber hardness at 0° C. is at most 64.

The content of a natural rubber (NR) and/or a polybutadiene rubber (BR) is at least 80% by weight and preferably at least 90% by weight because the rubber component is hardly hardened at low temperature.

As the rubber component other than NR and BR, a diene rubber is preferable. As the diene rubber, for example, an isoprene rubber (IR), a styrene-butadiene rubber (SBR), an acrylonitrile-butadiene rubber (NBR), a chloroprene rubber (CR), a butyl rubber (IIR) and a styrene-isoprene-butadiene copolymer rubber (SIBR) can be used. These diene rubbers may be used alone and at least 2 kinds may be used in combination.

Further, the rubber component is preferably a rubber component comprising 20 to 80% by weight of NR and 80 to 20% by weight of BR because the rubber component is hardly hardened even at low temperature and the strength and abrasion resistance of the rubber can be secured. A rubber component comprising 30 to 70% by weight of NR and 70 to 30% by weight of BR is more preferable.

As the NR, NR having grades such as RSS#3 and TSR20, which have been conventionally used in the rubber industry, can be used.

As the BR, those that have been conventionally used in the rubber industry are not specifically limited and those such as UBEPOL BR150B manufactured by Ube Industries Ltd. and NIPOL BR1220 manufactured by ZEON Corporation can be used.

The compounding amount of sulfur is at most 0.5 part by weight and more preferably at most 0.3 part by weight based on 100 parts by weight of the rubber component because hardness suitable for a studless tire can be obtained. Further, if objective hardness can be obtained by a fixed organic vulcanizing agent described later, sulfur may not be compounded for the rubber component.

An organic vulcanizing agent having a structure represented by the under-mentioned general formula (1):

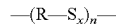

(wherein R is $(CH_2-CH_2-O)_m-CH_2-CH_2$, x is an integer of 3 to 6, n is an integer of 10 to 400 and m is an integer of 2 to 5) is used as the organic vulcanizing agent, because the thermal stability of a vulcanized rubber is good and mechanical fatigue property is not lowered.

In the formula, x is at least 3 and preferably at least 4. When x is less than 3, vulcanization is delayed. Further, x is at most 6 and preferably at most 5. When x exceeds 6, the production of the rubber composition is difficult.

In the formula, n is at least 10 and preferably at least 50. When n is less than 10, the organic vulcanizing agent vaporizes easily and its handling is difficult. Further, n is at most 400 and preferably at most 300. When n exceeds 400, compatibility with a rubber is deteriorated.

In the formula, m is at least 2. When m is less than 2, the bending performance of the rubber composition obtained is lowered. Further, m is at most 5 and preferably at most 4. When m exceeds 5, the adequate hardness of the rubber composition is not obtained.

In the present invention, for example, 20S4 Polymer (m=2, x=4 and n=200) manufactured by Kawaguchi Chemical Industry Co., Ltd.:

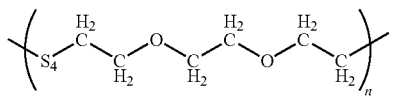

can be preferably used as the organic vulcanizing agent.

The content of the organic vulcanizing agent is at least 1 part by weight based on 100 parts by weight of the rubber component and preferably at least 1.5 parts by weight. When the content of the organic vulcanizing agent is less than 1 part by weight, the adequate reinforcing property (hardness and rubber strength) of the rubber is not obtained. Further, the content of the organic vulcanizing agent is at most 30 parts by weight based on 100 parts by weight of the rubber component and preferably at most 25 parts by weight. When the content of the organic vulcanizing agent exceeds 30 parts by weight, the hardness of the rubber is remarkably increased and the rubber is fragile.

Crosslinking units below can be introduced by compounding the aforementioned organic vulcanizing agent in the rubber composition of the present invention and reversion can be greatly suppressed without providing influence on vulcanization speed and scorch. Further, the heat resistance of the rubber composition that cannot be adequately obtained by general sulfur crosslinking and resistance against dynamic stress can be obtained. Further, the rubber composition being good in appearance can be obtained because of hardly blooming.

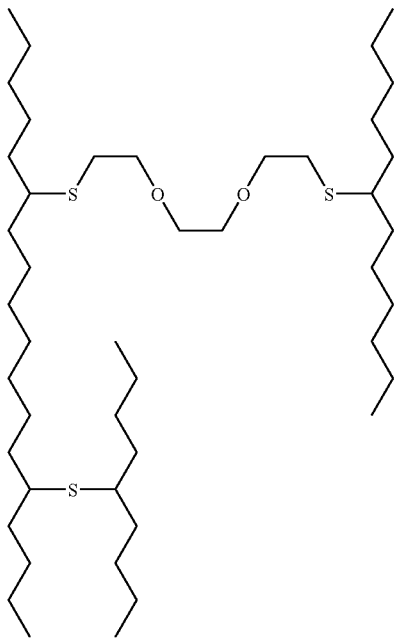 [SMILES: CCCCCCC(CCCCC)SCCOCCOCCSC(CCCCC)CCCCCCCC(CCCC)SC(CCCC)CCCC]

The organic vulcanizing agent is preferably added and kneaded under temperature condition of 80 to 130° C. in the production of the rubber composition. When it is less than 80° C., adequate kneading is not carried out. When it exceeds 130° C., vulcanization is readily started, so that problem is generated that adequate kneading is not carried out.

The tan δ peak temperature (Tg) of the rubber composition for a studless tire of the present invention is at most −50° C. and preferably at most −55° C. because it is hardly hardened at low temperature. When the tan δ peak temperature Tg of the rubber composition is higher than −50° C., temperature dependence is enlarged and performance on snow and ice is lowered because property at low temperature is deteriorated. Further, the tan δ peak temperature (Tg) of the rubber composition for a studless tire of the present invention is preferably at least −90° C. and more preferably at least −80° C. because grip performance on wet asphalt road surface can be secured. When the tan δ peak temperature Tg of the rubber composition is lower than −90° C., breaking distance on wet asphalt road surface tends to be elongated.

The rubber hardness at 0° C. of the rubber composition for a studless tire of the present invention is at most 64 and preferably at most 60 because adequate grip performance on ice can be obtained. When the rubber hardness at 0° C. of the rubber composition is higher than 64, adequate performance on snow and ice is not obtained. The rubber hardness at 0° C. of the rubber composition for a studless tire of the present invention is preferably at least 35 and more preferably at least 40 because the rigidity of a tire can be secured. When the rubber hardness at 0° C. of the rubber composition is lower than 35, the rigidity of tire tread block is lowered and the response property of a steering tends to be lowered.

The rubber composition for a studless tire of the present invention can suppress the aging increase of hardness of a studless tire and can keep good performance on snow and ice over long period by comprising the predetermined amounts of the aforementioned rubber component, sulfur and the predetermined organic vulcanizing agent.

In addition to the rubber component, sulfur and the organic vulcanizing agent, additives such as fillers, various oils, various antioxidants, stearic acid, zinc oxide and various vulcanization accelerators can be suitably compounded in the rubber composition for a studless tire of the present invention, if necessary.

As the fillers, carbon black, silica, clay and aluminum hydroxide can be used. These fillers may be used alone and at least 2 kinds may be used in combination. As the fillers, carbon black and/or silica are preferable and carbon black is more preferable because they are superior in reinforcing property and processability.

The studless tire of the present invention can be produced by a usual method using the rubber composition for a studless tire of the present invention. Namely, the line speed of the rubber composition is suitably adjusted so that the rubber composition is not excessively heated, then, in unvulcanized condition and using a calendar roll, an unvulcanized rubber sheet with a predetermined size is prepared using the rubber composition for a studless tire compounding the fore-mentioned compounding agents according to requirement. It is molded in, for example, the shape of tire member such as a tread, and unvulcanized tires are molded by molding it together with other member of a tire on a tire molding machine by a usual method. The tires of the present invention are obtained by heating and pressuring the unvulcanized tires in a vulcanizer.

EXAMPLES

The present invention is specifically illustrated based on Examples but the present invention is not limited only to these.

Various chemicals used in Examples and Comparative Examples are specifically described below.

Natural rubber (NR): RSS#1
Polybutadiene rubber (BR): BR150B manufactured by Ube Industries Ltd.
Carbon black: Show Black N339 manufactured by Cabot Japan K.K.
Silica: Ultrasil VN3 available from Evonik Degussa GmbH
Silane coupling agent TESPT: Si69 (bis(3-triethoxysilylpropyl)tetrasulfide) available from Evonik Degussa GmbH
Naphthenic oil: PROCESS P-200 manufactured by Japan Energy Co., Ltd.
Antioxidant: Ozonone 6C (N-(1,3-dimethylbutyl)-N'-phenyl-p-phenylenediamine) available from Seiko Chemical Co., Ltd.
Wax: SUNNOC Wax available from OUCHISHINKO CHEMICAL INDUSTRIAL CO., LTD.
Stearic acid: "Kiri" available from NOF CORPORATION
Zinc oxide: ZINC OXIDE #2 available from Mitsui Mining and Smelting Co., Ltd.
Sulfur: Powder Sulfur available from Karuizawa Sulfur Co., Ltd.
Compound 1: 2OS4 Polymer (m=2, x=4 and n=200) trial piece manufactured by Kawaguchi Chemical Industry Co., Ltd.

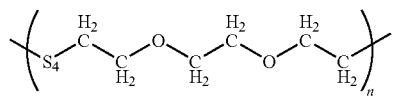

Vulcanization accelerator: NOCCELER CZ (N-cyclohexyl-2-benzothiazylsulfenamide) available from OUCHISHINKO CHEMICAL INDUSTRIAL CO., LTD.

Examples 1 to 4 and Comparative Examples 1 to 4

Chemicals other than sulfur and a vulcanization accelerator were kneaded according to the compounding prescriptions shown in Table 1 under the condition of 140° C. for at least 5 minutes using a 1.7 L Banbury mixer manufactured by Kobe Steel Ltd. to obtain kneaded articles. Then, sulfur and the vulcanization accelerator were added to the kneaded articles obtained and the mixture was kneaded under the condition of at most 100° C. for 3 minutes by an open roll, to prepare unvulcanized rubber sheets. Further, the vulcanized rubber compositions of Examples 1 to 4 and Comparative Examples 1 to 4 were prepared by vulcanizing the unvulcanized rubber sheets under the condition of 165° C. for 25 minutes. Then, rubber physical properties (tan δ peak temperature (Tg) and rubber hardness) were measured (evaluated) by the methods below using the samples.

(Tan δ peak temperature (Tg))

The tan δ peak temperatures of the rubber compositions were measured as glass transition temperature (Tg) from the temperature distribution curve of tan δ measured under the conditions of a frequency of 10 Hz, an initial strain of 10 Hz, an amplitude of ±0.25% and a temperature rising speed of 2° C./min, using a viscoelastic spectrometer manufactured by Iwamoto Seisakusyo K.K.

(Rubber Hardness at Room Temperature and 0° C.)

The rubber hardness of the vulcanized rubber compositions was measured with a type A durometer according to JIS K6253. The lower the value is, the better the performance on snow and ice is. Further, the rubber hardness at room temperature is rubber hardness measured at 23° C.

(Rubber Hardness After Thermal Aging)

The rubber compositions were thermally aged for 14 days in an oven at 85° C. and rubber hardness after cooling them till room temperature was measured with a type A durometer according to JIS K6253. The rubber composition having the less change in rubber hardness after thermal aging can keep initial performance over long period. When a rubber is hardened after thermal aging, even if the rubber is initially soft, the rubber is hardened after aging, and performance on snow and ice is lowered. Namely, when the increase of hardness after thermal aging is little, good performance on snow and ice can be kept over long period.

Table 1 shows respective evaluation results of the above-mentioned tests.

TABLE 1

|  | Examples |  |  |  | Comparative Examples |  |  |  |
| --- | --- | --- | --- | --- | --- | --- | --- | --- |
|  | 1 | 2 | 3 | 4 | 1 | 2 | 3 | 4 |
| Compounding amount (parts by weight) |  |  |  |  |  |  |  |  |
| NR | 60 | 60 | 60 | 60 | 60 | 60 | 60 | 60 |
| BR | 40 | 40 | 40 | 40 | 40 | 40 | 40 | 40 |
| Carbon black | 30 | 30 | 30 | 30 | 30 | 30 | 30 | 30 |
| Silica | 20 | 20 | 20 | 20 | 20 | 20 | 20 | 20 |
| Silane coupling agent | 1.6 | 1.6 | 1.6 | 1.6 | 1.6 | 1.6 | 1.6 | 1.6 |
| Naphthenic oil | 30 | 30 | 30 | 30 | 30 | 30 | 30 | 40 |
| Antioxidant | 2 | 2 | 2 | 2 | 2 | 2 | 2 | 2 |
| Wax | 2 | 2 | 2 | 2 | 2 | 2 | 2 | 2 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | — | — | — | 0.5 | 1.5 | 0.5 | 1.5 | 1.5 |
| Compound 1 | 1.0 | 4.5 | 25 | 3.0 | — | — | 3.0 | 3.0 |
| Vulcanization accelerator | 1 | 1 | 1 | 1 | 1 | 1 | 1 | 1 |
| Evaluation result |  |  |  |  |  |  |  |  |
| tan δ peak temperature (Tg) | −60 | −59 | −57 | −59 | −59 | −59 | −59 | −60 |
| Rubber hardness (at room temperature) | 34 | 42 | 60 | 42 | 42 | 39 | 50 | 42 |
| Rubber hardness after thermal aging |  |  |  |  |  |  |  |  |
| Rubber hardness | 37 | 44 | 62 | 45 | 49 | 43 | 57 | 50 |
| Change from rubber hardness (at room temperature) | +3 | +2 | +2 | +3 | +7 | +4 | +7 | +6 |

TABLE 1-continued

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Rubber hardness at 0° C. | | | | | | | | |
| Rubber hardness | 36 | 44 | 64 | 44 | 45 | 41 | 55 | 45 |
| Change from rubber hardness (at room temperature) | +2 | +2 | +4 | +2 | +3 | +2 | +5 | +3 |

Examples 1 to 4, which used the compound 1 as a crosslinking agent, suppress the increase of hardness after thermal aging and can keep good performance on snow and ice over long period.

Comparative Example 2, which did not use the Compound 1 and reduced the amount of only sulfur, is too soft and adequate hardness is not obtained. Comparative Example 3, which had much sulfur than 0.5 part by weight even if the Compound 1 is used, is hard from the beginning and the increase of hardness after thermal aging is much in comparison with Examples. Comparative Example 4, which adjusted hardness from Comparative Example 3 with naphthenic oil, is great in the increase of hardness after thermal aging because sulfur is much.

INDUSTRIAL APPLICABILITY

According to the present invention, the aging increase of hardness of a studless tire can be suppressed and good performance on snow and ice can be kept over long period by reducing the compounding amount of sulfur and compounding the predetermined amount of the predetermined organic vulcanizing agent in the rubber component including the predetermined amounts of the predetermined natural rubber and polybutadiene rubber.

The invention claimed is:

1. A studless tire having a tread, wherein the tread is molded from a rubber composition comprising:
    at most 0.5 parts by weight of sulfur and
    1 to 30 parts by weight of an organic vulcanizing agent satisfying the general formula (1):

—(R—S$_x$)$_n$—     (1)

wherein R is (CH$_2$—CH$_2$—O)$_m$—CH$_2$—CH$_2$, x is an integer of 3 to 6, n is an integer of 50 to 400 and m represents an integer of 2 to 5 based on 100 parts by weight of a rubber component, tan δ peak temperature Tg is at most −50° C. and rubber hardness at 0° C. is at most 64; and the rubber component is a rubber component comprising 20 to 80% by weight of a natural rubber and 80 to 20% by weight of a polybutadiene rubber.

2. The studless tire of claim 1, wherein x is 4 to 5, and n is an integer of 50 to 300 and m represents an integer of 2 to 4.

3. The studless tire of claim 1, wherein the tan δ peak temperature Tg is at least −80° C. and at most −55° C., and wherein the rubber hardness at 0° C. is at least 40 and at most 60.

4. The studless tire of claim 2, wherein the tan δ peak temperature Tg is at least −80° C. and at most −55° C., and wherein the rubber hardness at 0° C. is at least 40 and at most 60.

* * * * *